Oct. 31, 1961  F. J. LUKETA  3,006,097
DOOR-SECURING STANCHION FOR TRAWLERS
Filed Dec. 22, 1959  6 Sheets-Sheet 1

INVENTOR.
FRANK J. LUKETA
BY Reynolds, Beach & Christensen
ATTORNEYS

Oct. 31, 1961  F. J. LUKETA  3,006,097
DOOR-SECURING STANCHION FOR TRAWLERS
Filed Dec. 22, 1959  6 Sheets-Sheet 2

INVENTOR.
FRANK J. LUKETA
BY
Reynolds, Beach & Christensen
ATTORNEYS

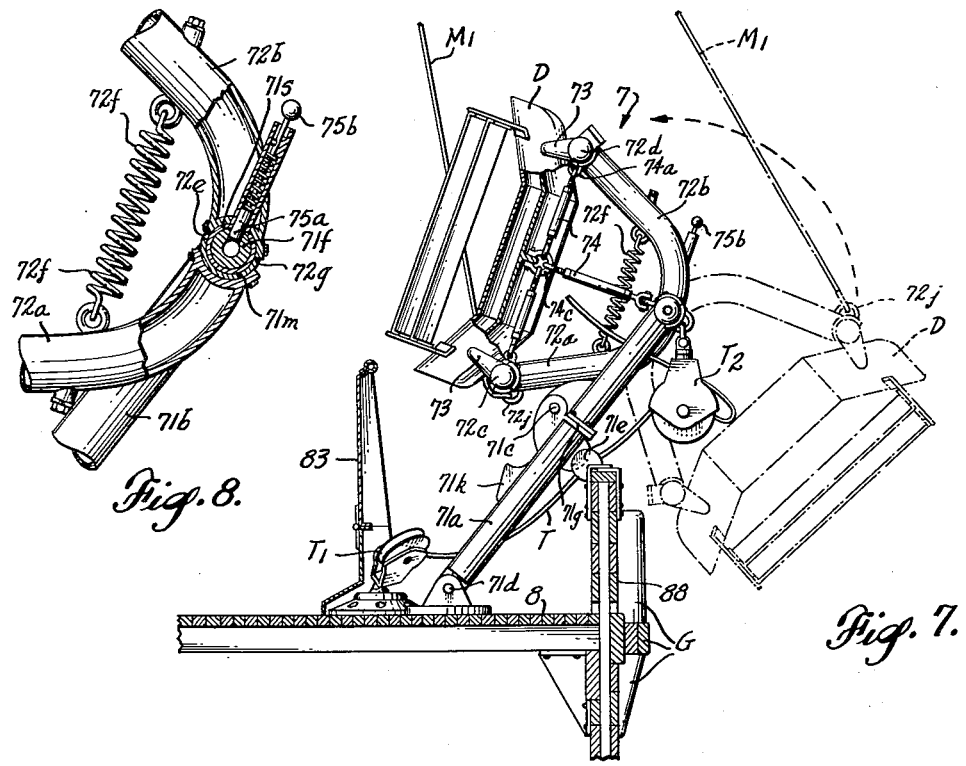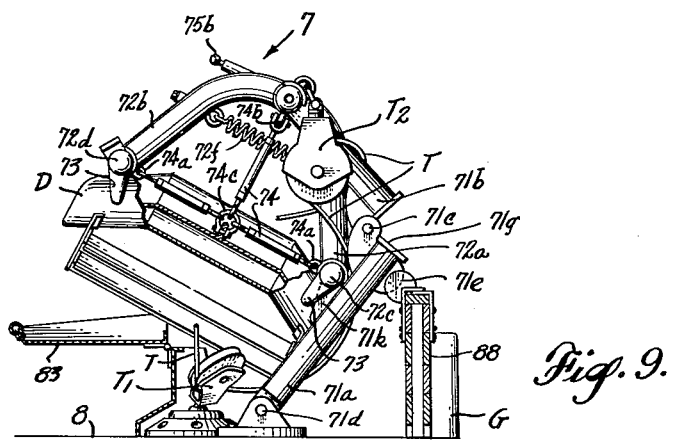

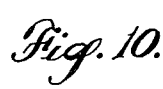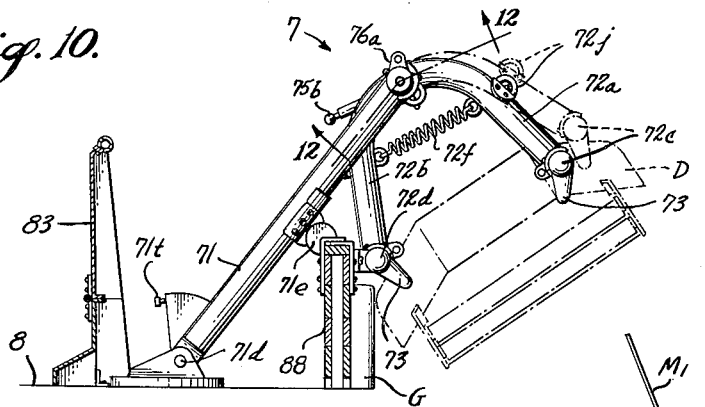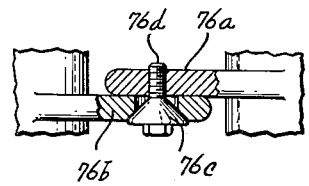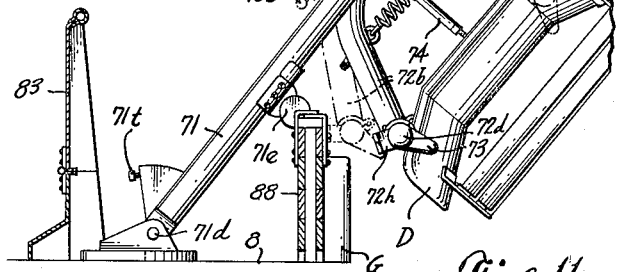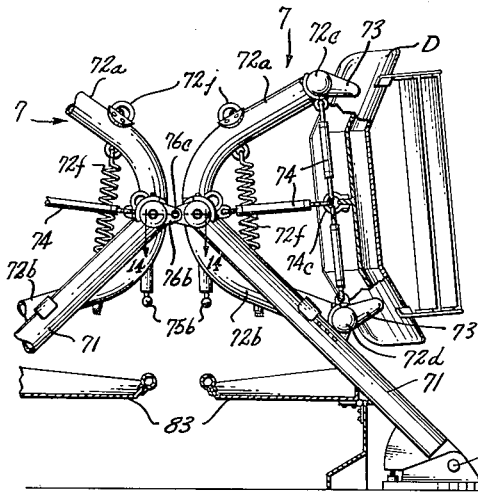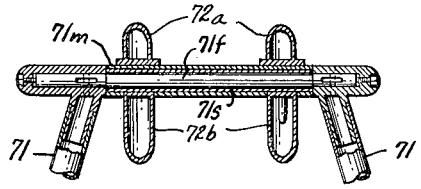

United States Patent Office 3,006,097
Patented Oct. 31, 1961

3,006,097
DOOR-SECURING STANCHION FOR TRAWLERS
Frank J. Luketa, 5567 Greenwood Ave., Seattle, Wash.
Filed Dec. 22, 1959, Ser. No. 861,325
17 Claims. (Cl. 43—8)

A trawler of the kind to which this invention pertains is disclosed in my co-pending application Serial No. 856,806, filed December 2, 1959, entitled Trawler. In general it comprises a vessel having, among other things, sufficient deck space aft for receiving and dumping the catch from the codend of a trawl net, normally into a trough of the kind shown in my co-pending application Serial No. 859,389, filed December 14, 1959, a winch for handling the net and its lines, the usual overhead boom, and stanchions for securement of doors, mentioned hereinafter. The lines include a first set used during trawling, and a substantially different second set used during hauling of the net, as set forth in my co-pending application Serial No. 570,771, filed March 12, 1956.

A trawl door ahead of each wing or curtain of the net is essential for spreading the wings apart as widely as possible. A door of suitable nature is disclosed in my co-pending application Serial No. 837,025, filed August 31, 1959. Such a door is incorporated in the first set of lines, between the after end of the towing warp, which attaches to the door at a single point, and the forward end of a curtain line and a sweep line, each of rather considerable length and extending to the opposite sides of the net. In hauling such a net, a winch of the type shown in my co-pending application Serial No. 576,941, filed April 9, 1956, or in my co-pending application Serial No. 836,636, filed August 28, 1959, is used. Such winches are characterized by the provision of at least three separate drums, a central one whereon the curtains or wings, and eventually the net body, may be reeled, and at least two others at opposite ends of the central drum for reeling in or out the respective towing warps at opposite sides of the trawler. Controls provide for independent or conjoint operation of the several drums.

Since the doors, of large bulk and quite heavy, are interposed during trawling in the first set of lines at a considerable distance ahead of the net body which is to be reeled upon its drum, it is necessary to secure these doors when they are hauled to the trawler, and then to connect a hauling line by-passing the doors and extending directly from the central drum, or other drums rotatable therewith, to the net or to a lazy line secured to the net, so that the net can be disconnected from the doors and so hauled in. The stanchions previously mentioned are for the securement of the doors, and this invention resides in such stanchions and the mechanism associated therewith, for the purpose stated.

More particularly, it is the general object of this invention to provide a stanchion so formed and located, and so associated with a towing warp and its guides, and of a size to handle a given door, that the reeling in of the towing warp will bring the door yieldably and automatically against the under side of the corresponding stanchion, out of water, and retain it there securely while the net trails aft thereof and after the net is otherwise connected, reeled in, and emptied, and which stanchion can be used in a different position to stow the doors well inboard when the trawler is under way, or docked.

Especially is it an object to provide a stanchion usable in the manner just stated, which will automatically receive, retain, and position the door during a hauling operation, by merely reeling in the towing warp, and which by proper connection and manipulation of a boom fall line will stow the doors and stanchions inboard where they clear the deck space, or at least are not left hanging outboard as they are during hauling, and where they would strike a dock or an adjacent vessel, when berthed. All such operations, especially movement to and from stowed position, and movement into secured position during hauling, are effected by readily available power-operated gear coordinated with the stanchions, and involve a minimum of manual labor.

Also it is an object to provide such stanchions which will leave working deck space clear during disposition of a haul, and which, conversely, will leave clear space, in one embodiment at least, along the bulwarks for handling of mooring lines and the like.

It is also an object to provide a stanchion of the sort indicated, which is strong and rugged, and which includes a minimum of parts subject to wear or to failure in use.

The novel features which distinguish this invention are shown in two somewhat different embodiments in the accompanying drawings, and will be described and claimed hereinafter.

FIGURE 7 is a view similar to FIGURE 4, showing the stanchion and door in an intermediate position, between the secured position of FIGURE 6 and a stowed position.

FIGURE 8 is a view similar to FIGURE 5, showing the latch in engagement, to retain the stanchion and door temporarily in the intermediate position of FIGURE 7.

FIGURE 9 is a view similar to FIGURE 4, showing the stanchion and door in the stowed position.

FIGURE 10 is a view similar to FIGURE 4, showing a slightly different form of stanchion in position for engagement by a door, during hauling.

FIGURE 11 is a view of the latter form of the stanchion with door secured and inboard stowage commenced.

FIGURE 12 is an axial sectional view along the hinge axis of the stanchion, as indicated at 12—12 in FIGURE 10.

FIGURE 13 is a view corresponding to FIGURE 9, with the second form of stanchion in stowed position.

FIGURE 14 is a detail sectional view, at the line 14—14 of FIGURE 13.

Figure 1:
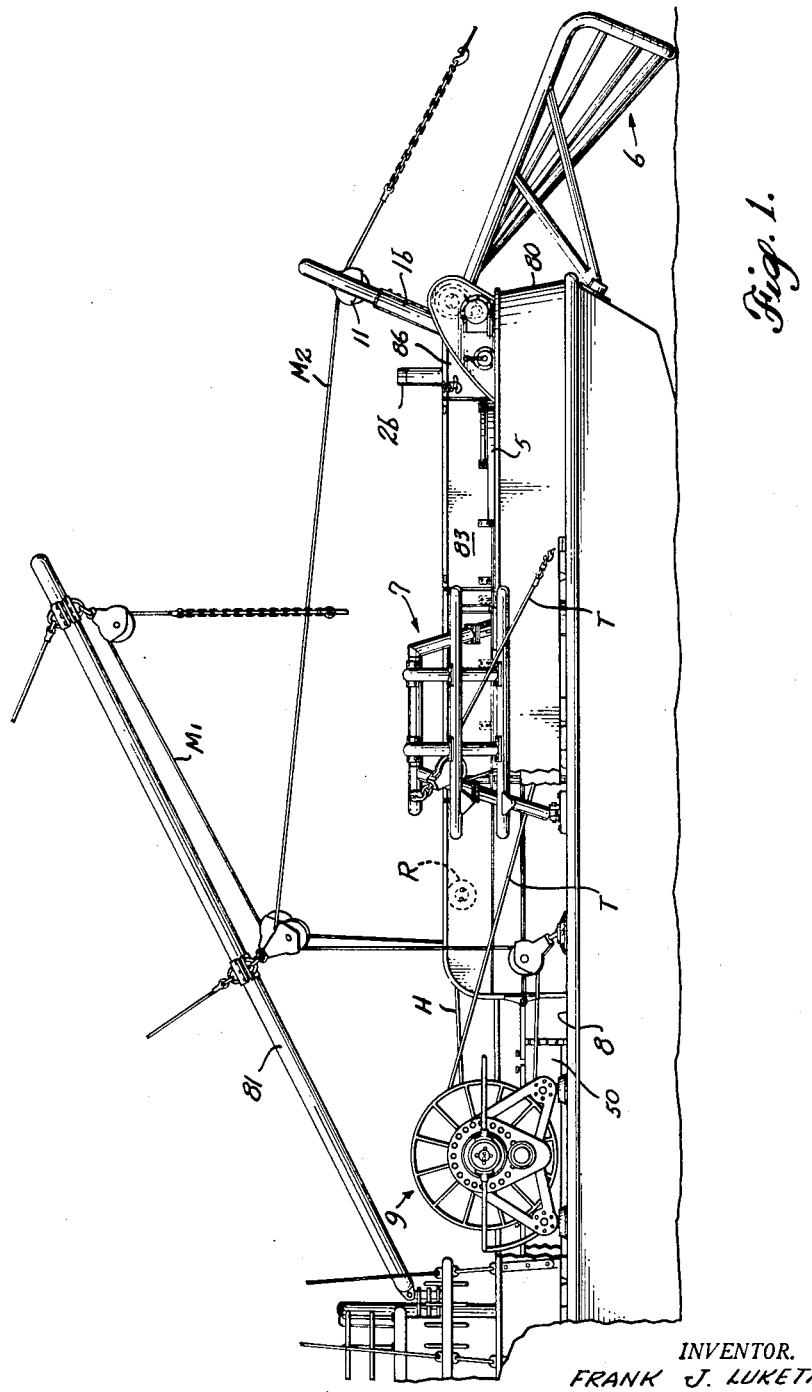
FIGURE 1 is a general side elevational view of the stern portion of a trawler equipped with the stanchions of this invention, showing as well other equipment which is the subject of other applications for patent, copending herewith. Parts are in the positions for trawling.
Figure 2:
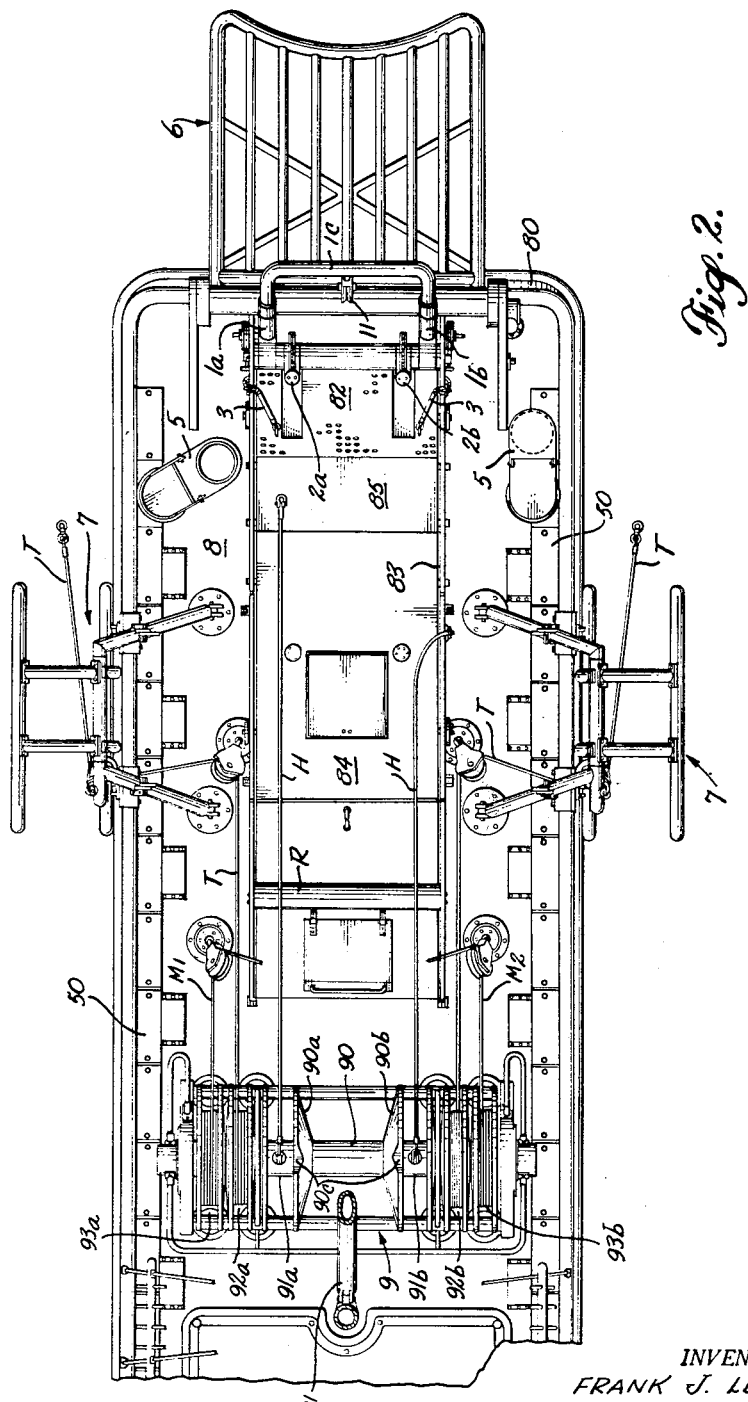
FIGURE 2 is a general plan view corresponding to FIGURE 1.

Referring to FIGURES 1 and 2, the stern of the trawler has various gear on its deck 8 at the stern 80 and extending about to amidship. A winch 9, of a type shown in applications Serial Nos. 576,941 and 836,636, referred to above, has a wide and deep central drum 90 for reeling on the net body; drums 91a and 91b for reeling on hauling lines H and net wings or curtains to which they are connected during hauling; drums 92a and 92b for receiving towing warps T connected to the doors, and used during trawling and during the initial stage of hauling; and drums 93a and 93b for utility purposes, as for example, the drum 93a handles a boom fall line M1 running to and then down from the boom 81, and the drum 93b handles a line M2 for dragging a trynet. These several drums are for the most part each individually controllable, although drums 91a, 91b, and 90 are intended to rotate alike, lines on drums 91a and 91b being transferred during hauling onto the drum 90, passing them through the notches 90c in the flanges 90a and 90b. The lines used during the final stage of hauling pass over a roller R and between paired upstanding guides 1a, 2a and 1b, 2b at the stern, the guides 1a and 1b being joined by a bridge 1c from which hanges a block 11. A ramp 6 extends during hauling between the water level and over the after bulwark, to guide the net body. Short snubber lines 3 are shown, these being used only during hauling of the net.

The entire net is hauled on deck over the stern, and its forward portion is reeled onto the drum 90. This leaves its codend within a trough which includes the upstanding side walls, including the lower fixed portion 86, topped by the hingedly mounted upper extensions 83, the lower landing 85, a steeply inclined after end plate 82, and a gradually sloped forward end plate 84. The side walls are spaced inboard of the side bulwarks, to afford space for crew members to stand while sorting fish into chutes 5, or throwing "junk" fish overboard, which usable fish then travel by conveyors housed in at 50 to a predetermined bin in the hold. Various parts of the gear described thus in general terms are the subjects of copending applications, to which reference may be had for greater detail, but such details have no bearing on this present invention.

The door-securing stanchions with which this invention is concerned are shown generally at 7, and are located somewhat ahead of the sorting stations, at the port and starboard rails, respectively, in the space between the trough and these rails. During trawling they are extended outboard, but while the trawler is under way or berthed the stanchions and the doors supported by the stanchions should be stowed well inboard, to avoid interference with docks or vessels alongside. The stanchions are arranged for securement in either such position, yet for ready movement between the two positions, with a minimum of effort required to effect such movement.

The stanchions are alike, hence one only will be referred to, and the one chosen is at the port rail. It comprises, in effect, a supporting frame, primarily legs for supporting the whole from the deck 8 and the adjacent bulwark 88, and a cradle, hereinafter described more fully, which defines a surface which faces downwardly for engaging and securing the door D when the latter is pulled up out of the water by tension applied to the towing warp T. This requires positioning of a towing warp guide above and within the outline of the pulled-up door. The cradle is desirably yieldable or spreadable to a limited extent under the influence of pull on the towing warp urging the door upwardly against the cradle, and also is swingable about a fore-and-aft axis relative to the upper ends of the legs. The legs are wholly or partially swingable inboard into stowed position, by their swinging carrying the doors well inboard. These movements of the different parts of the stanchion must be made easily when desired, but must be prevented when not desired. The mechanism which will now be described in detail will accomplish these ends.

Figure 3:
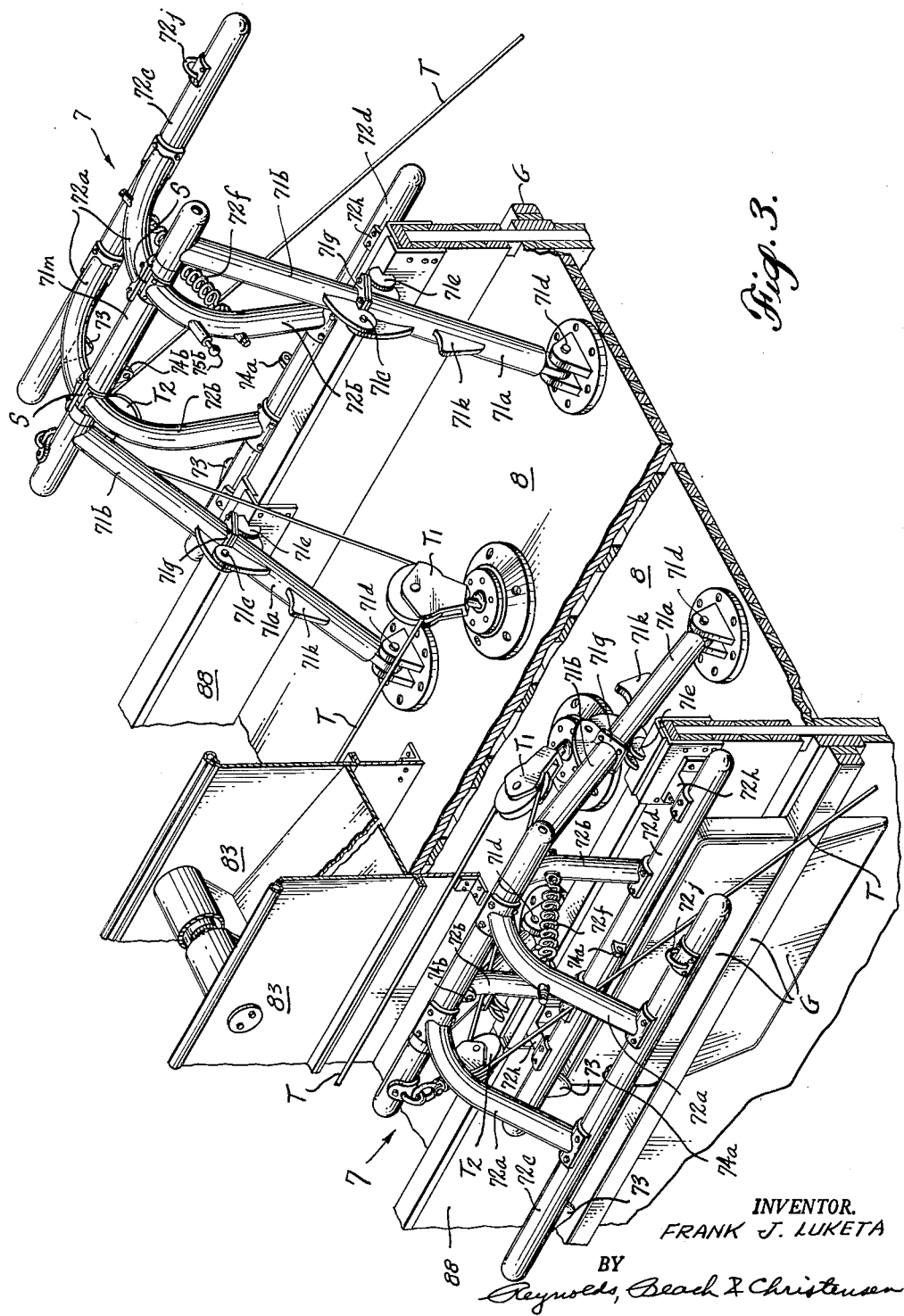
FIGURE 3 is a broken-away isometric view from the port quarter, looking forward, illustrating the stanchions as they would be positioned during trawling.

The stanchion shown in FIGURES 4 to 9 inclusive will first be described, and differs slightly from the form shown in FIGURES 10 to 14. One such form might be preferred in one installation and the other form in a different installation. The form of FIGURES 4 to 9 (being also that shown in FIGURES 1 to 3) includes forward and after legs each formed of two parts or sections 71a, 71b hingedly connected at 71c but secured by bolts joining the flanges 71g against unintentional hinging movement. The lower section 71a is secured, hingedly or otherwise, to the deck 8 in a fixed location, by means such as the pivot mount at 71d, and secured at 71e to the rail 88. The upper section 71b continues upwardly and outboard, and the two such upper sections are rigidly joined by a fore-and-aft rod 71f.

Hingedly mounted about the axis of the rod 71f is a cradle consisting of two longitudinally directed outboard arms 72a fixed to the outer coaxial tube 71m and spaced fore and aft and joined at their swinging ends by a fore-and-aft bar 72c, and two like inboard arms 72b fixed to the inner coaxial tube 71s through a slot S in the outer tube 71m and joined by a bar 72d paralleling but spaced from bar 72c. Both bars 72c and 72d extend fore and aft. The cradle as viewed fore and aft is of U-shape, and the bars 72c and 72d are spaced apart, and a plane extended through both of their axes constitutes a surface facing downwardly. In other words, the cradle engages the door at opposite sides of the point where the towing warp T is anchored to the door, the contour of the cradle elements (bars 72c and 72d) defining a surface which is complemental to the longitudinal surface contour of the door along the lines of contact (whether such lines define a plane or a curve), and thereby the door can be held in one position when drawn up by the towing warp against the stanchion, without the possibility of its movement relative to the cradle. The upper and lower edges of the water-reaction face of a door D, when the door is drawn upwardly, engage such bars and are pulled tightly thereagainst, the intermediate portion of the door entering the U-space between the bars. The door illustrated is of the type shown in my copending application Serial No. 837,025, as already mentioned. The cradle, yielding resists upward pulling of the door. Thus the bars 72c and 72d when not engaged by a door are urged together against a stop 72e (FIGURE 5) by a stiff tension spring 72f, but can be spread in opposition to the spring to engage the door along widely spaced lines, and thereby to steady the door, the spreading being to an extent limited by stops 72g by pressure of the door upwardly (these stops are the radial limits of the slot S in outer tube 71m). Actually only the bar 72c moves, for the bar 72d and its arms 72b are releasably fixed to the rail 88 at 72h. The cradle bars might merely yield upwardly instead of spreading, although the stanchion would operate satisfactorily if there were no spreading or yielding. End stops 73 engage an end of the door, to prevent its endwise movement when secured. The steel spring 72f should be coated with rubber to prevent salt water corrosion.

Figure 4:
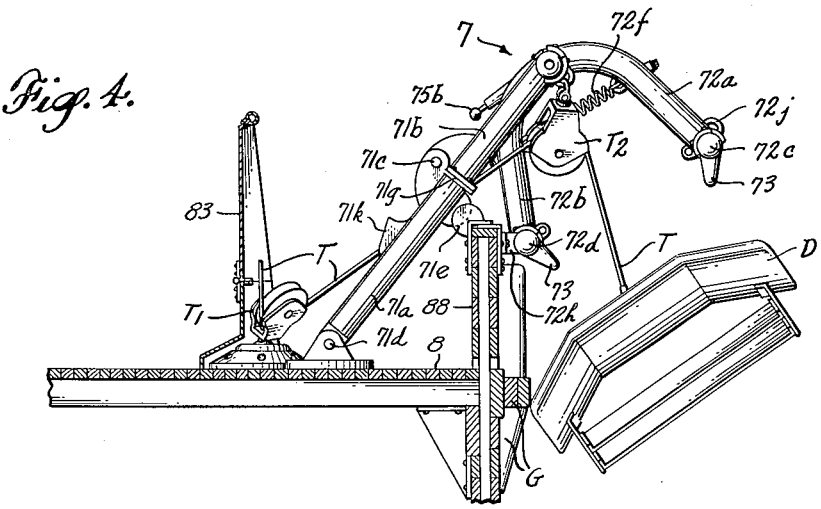
FIGURE 4 is a transverse section through the port bulwark and deck, looking aft, and illustrating a door being hauled up for engagement with its stanchion, the latter shown in end elevation.
Figure 6:
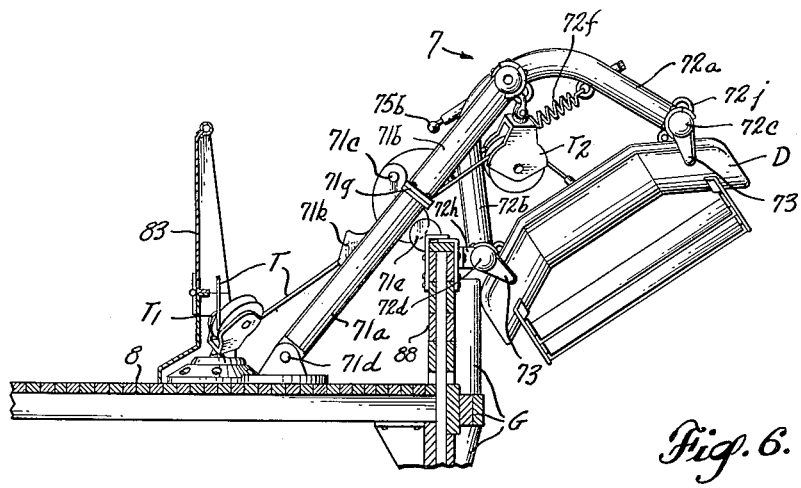
FIGURE 6 is a view similar to FIGURE 4, showing the door fully secured, as it would be during hauling of the net.
Figure 5:
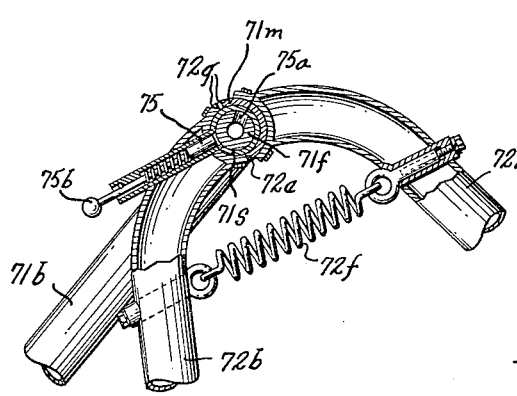
FIGURE 5 is a detail section, transversely through a hinge axis of the stanchion, illustrating a releasable latch for securement of the door and stanchion in stowed position.

When a net is to be hauled, the initial operation is to reel in the towing warp T (one at each rail) which is guided by blocks T1 on deck and T2 at the forward end of the cradle, and within the outline of the given door when secured, until the door D reaches the vessel. It is hauled on up by the towing warp, in a line determined by the location of block T2, as FIGURE 4 shows, a bumper or guard G protecting the vessel, until the door contacts the bars 72c, 72d, and causes them to yield or spread as far as is permitted. The plane defined by the bars matches a plane or planes lengthwise of the door, and the door then may not tilt nor turn. The forward end of the door engages end stops 73, for the pull from the forwardly located towing warp guide T2 is in that direction. Now the door is secure, and remains in this position until the hauling is completed, and the net is reset. The towing warp T and locking means of any suitable or known nature associated with the drums whereon the same are reeled, effect the securement.

When the vessel is to be under way, as for example, when running to port with a catch, the stanchions and doors should not be left outboard, but should be swung inboard. FIGURES 7, 8 and 9 illustrate this operation. The door having been temporarily secured as previously described, by the towing warp, is first otherwise secured to the cradle, as by tension elements 74, including turnbuckles or the like, intermediate anchorages 74a at the opposite bars 72c, 72d, and 74b at the tube 71m, and 74c at the door. Now the towing warp can be slacked, and a boom fall line M1 is engaged at 72j outboard on the cradle, to rotate the cradle (its anchorage at 72h having first been released) through the dash line position of FIGURE 7 to the full line position thereof about the pivot mount shown in detail in FIGURE 5, where the arms are supported at the upper ends of the legs. In the latter position a spring latch 75b carried by cradle arm 72b engages within a notch or hole 75a in the nonrotative rod 71f. The stanchion and door are now in the full line position of FIGURE 7, but preferably are swung further inboard.

To do so, the bolts securing flanges 71g are removed, allowing the upper leg part 71b to hinge at 71c relative to the lower leg part 71a. The bar 72c is lowered into the recess 71k on leg part 71a, and the stanchion's upper part and the door swing to the position of FIGURE 9 where they are secured by gravity. Note that the trough extension 83 hinges inwardly, out of the way. The rail space is reasonably clear, and nothing overhangs outboard.

The form of FIGURES 10 to 13 operates quite similarly, but affords clearer deck space along the rails. Here the legs 71 are continuous for their full length. Each is pivotally secured at the pivot mount 71d to the deck and at 71e to the rail, respectively. The cradles are the same as those already described. When the net is to be hauled, the towing warp T pulls the door D up against the cradle, spreading the bars 72c and 72d as before. When the door and stanchion are to be stowed, the tension members 74 are engaged and tightened, the towing warp T is slacked, and a fall line M1 engages the cradle as before. Now the cradle is pivoted about the pivot mount for the arms from the dot-dash position to the solid line position and locked by the latch 75b (this so that the door and cradle will clear the rail 88 when swung inboard). Then the securement 71e at the rail is released, the legs and cradle pivot mount about the deck pivot at 71d, and the whole swings inboard to the position in FIGURE 13. The latch 75b is released and the cradle is lowered until the bar 72d rests against leg 71. Gravity provides the securement. The opposite stanchions, at port and at starboard, may be so installed that they substantially meet, and ears 76a and 76b (FIGURE 14) overlap and permit engagement of a coned head 76c of a bolt 76d to draw the two stanchions tightly together, thus securing them in fully stowed position. An adjustable stop at 71f limits inboard swinging of the legs 71.

This form substantially clears a walkway between the trough and the rail.

I claim as my invention:

1. Mechanism for securement aboard a trawler of a door having a towing warp secured to it, and used to spread outwardly a wing of a net, said mechanism including legs having means for mounting them upon the trawler in a position to extend outboard, a cradle including elements mounted upon the outboard end of the respective legs and together defining a downwardly facing surface which is complemental to the door's upper surface, to engage and cradle an upwardly drawn door, and a guide for the towing warp mounted above and within the outline of said cradle, whereby a pull on the towing warp will draw the door into secured position relative to said cradle.

2. Mechanism as in claim 1, including means incorporated in the cradle, and reacting between the elements thereof, and yieldable in response to upward movement of the door to its final cradled position.

3. Mechanism as in claim 1, the cradle elements including bars longitudinally directed and spaced to engage the door at opposite sides of the towing warp guide, and means supporting said bars yieldably for limited separation.

4. Mechanism as in claim 1, wherein the surface-defining elements of the cradle are positioned to engage the door along opposite sides, end stops carried by the cradle in position to engage an end of the door, and the towing warp guide being located to draw the door endwise against said end stops as well as upwardly against the surface-defining elements.

5. Mechanism as in claim 1, wherein the legs are pivotally mounted, in part at least, for swinging inboard and outboard, and releasable means for securing said legs in their outboard-swung position.

6. Mechanism as in claim 1, wherein the cradle is pivotally mounted upon the outer end of the legs, for swinging inboard and outboard.

7. Mechanism as in claim 1, wherein the legs are pivotally mounted, in part at least, for swinging inboard and outboard, and the cradle is pivotally mounted upon the outer end of the legs, also for swinging inboard and outboard, and releasable means for securing the legs and the cradle in their respective outboard-swung positions.

8. Mechanism for the securement aboard a trawler of a door used to spread outwardly a wing or curtain of a net, including a forward and an after leg each extending, during use, generally outboard at a bulwark of the trawler, a cradle mounted at the outer ends of said legs and including parallel fore-and-aft door-engaging bars the surfaces whereof conjointly define a plane generally facing downwardly clear of the legs, the bars being spaced far enough apart to engage the door along laterally widely spaced lines, cable-guide means carried by the stanchion and located within the area defined by the bars, in position for guiding a cable secured to the door, for pulling the cable in a line passing between said bars, to haul the door clear of the water and against the under side of said cradle, and yieldable means to urge the bars downwardly, thereby resisting the upward pressure of the door against said cradle.

9. Mechanism as set forth in claim 8, including fore-and-aft pivot means for mounting at least the upper ends of the legs, whereby the same may be swung inboard, for securement thus in stowed position.

10. Mechanism as set forth in claim 9, including a pivot mount for the cradle at the upper ends of the legs, and releasable latch means for retaining the cradle in the stated position during use, said cradle being swingable relative to said legs inboard upon release of said latch means and inboard swinging of the legs.

11. Mechanism as set forth in claim 8, including arms supporting each door-engaging bar from the legs, and each pivotally mounted for limited swinging about a fore and aft axis at the upper ends of the legs, for limited separation or approach of the opposite bars, and yieldable means urging said arms and bars into their positions of closest approach, but yieldable for limited separation of the bars by upward pressure of the door.

12. Mechanism as in claim 1, including a pivot mount for the lower ends of the legs, for swinging of the legs bodily inboard and outboard, and releasable means for securing the legs in such respective positions.

13. Mechanism as in claim 12, including a pivot mount for the cradle at the outer end of the legs, and releasable means to secure the cradle against swinging relative to the legs.

14. Mechanism as in claim 1, wherein each leg includes an outer and an inner section hingedly connected for swinging inboard and outboard, and releasable means for securing the leg sections in outboard-swung position.

15. Mechanism as in claim 14, including a pivot mount for the cradle at the outer end of the outer section of the legs, and releasable means to secure the cradle against swinging relative to said leg section.

16. Mechanism for securement aboard a trawler of a door which has a towing warp secured within the area of its forward face, said mechanism including a supporting frame arranged for securement while trawling in a fixed position at the trawler's rail, and including an outboard extension, a cradle carried by said outboard extension, and having door-engaging elements conjointly defining a downwardly facing surface of a size and shape to engage a given door at widely spaced lines, and a guide for the towing warp supported by said frame at a position above and within the surface so defined, to retain the door against said cradle so long as the towing warp is tensioned.

17. Mechanism as in claim 16, including end stops carried by said cradle in position to engage an end of the given door when drawn upwardly into contact with the cradle, said towing warp guide being located nearer this end of the cradle than its opposite end.

References Cited in the file of this patent

UNITED STATES PATENTS 2,619,754    Slater _____ Dec. 2, 1952